Figure 1:
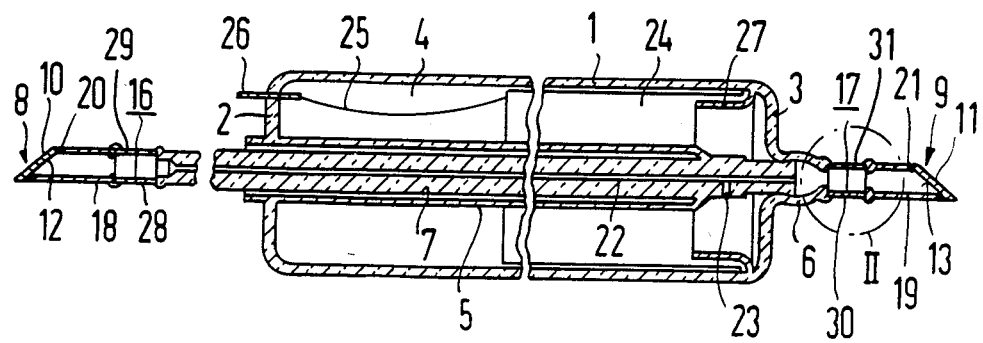

United States Patent [19]

Golser

[11] Patent Number: 4,564,948
[45] Date of Patent: Jan. 14, 1986

[54] GAS LASER TUBE

[75] Inventor: Hans Golser, Munich, Fed. Rep. of Germany

[73] Assignee: Siemens Aktiengesellschaft, Berlin and Munich, Fed. Rep. of Germany

[21] Appl. No.: 593,609

[22] Filed: Mar. 26, 1984

[30] Foreign Application Priority Data

Mar. 30, 1983 [DE] Fed. Rep. of Germany ....... 3311726

[51] Int. Cl.$^4$ .............................................. H01S 3/03
[52] U.S. Cl. ..................................................... 372/61
[58] Field of Search ....................... 372/61, 55, 103, 34

[56] References Cited

U.S. PATENT DOCUMENTS 4,063,803 12/1977 Wright et al. ........................ 378/103
4,352,185 9/1982 Crane ..................................... 372/29

Primary Examiner—William L. Sikes
Assistant Examiner—Léon Scott, Jr.
Attorney, Agent, or Firm—Herbert L. Lerner; Laurence A. Greenberg

[57] ABSTRACT

A gas laser tube with a vacuum envelope, includes:
a tubular section formed of an electrically insulating material with a coefficient of thermal expansion $H_1$;
an end section formed of an electrically insulating material with a coefficient of thermal expansion $H_2$, such that $$\left| \frac{H_1 - H_2}{H_i} \right| \geq 0.2,$$

wherein $i = 1, 2$; and
a transition element connecting the tubular section to the end section;
the transition element including a first metallic section adjacent the tubular section and a second metallic section, the first and second metallic sections having different respective coefficients of thermal expansion $H_3$ and $H_4$;
the first metallic section being thermally matched to the tubular section such that $$\left| \frac{H_1 - H_3}{H_m} \right| < 0.2,$$

wherein $m = 1, 3$;
the second metallic section being thermally matched to the end section such that $$\left| \frac{H_2 - H_4}{H_n} \right| < 0.2,$$

wherein $n = 2, 4$;
the first and second metallic sections having end surfaces with mutually complementary steps formed therein being disposed inside each other; and
the first and second metallic sections having inner wall surfaces being joined together.

15 Claims, 2 Drawing Figures

U.S. Patent        Jan. 14, 1986        4,564,948

GAS LASER TUBE

The invention relates to a gas laser tube with a vacuum envelope, containing a tubular section or envelope section formed of an electrically insulating material with a coefficient of thermal expansion $\chi_1$, an end section formed of an electrically insulated material with a coefficient of thermal expansion $\chi_2$, such that $$\left| \frac{H_1 - H_2}{H_i} \right| \geqq 0.2,$$

wherein i=1, 2,
and a trasition element connecting the tubular or envelope section to the end section, the transition element including two metallic sections or metal rings with different coefficients of thermal expansion $\chi_3$ and $\chi_4$, respectively, and the metallic section or ring adjacent the envelope section being thermally matched to the envelope section such that $$\left| \frac{H_1 - H_3}{H_m} \right| < 0.2,$$

wherein m=1, 3.

Such a laser structure is known, for instance, from U.S. Pat. No. 4,063,803.

In most gas lasers, the vacuum envelope is closed off by optical elements which are thermally unmatched to the envelope body. This situation would not be critical if an epoxy resin which hardens at temperatures under 200° C. and remains relatively elastic, was used for fixing the terminating element in place. However, organic adhesives have not been used for years because they are not completely impermeable, they do not permit high baking-out temperatures and furthermore they contaminate the gas filling with components of their own. According to experience, high-quality seals are only produced if soldered, fused or welded joints are used and the mismatch between the envelope and the window is intercepted by a suitable transition structure.

In the U.S. Patent mentioned above, a capillary end with the following structure is disclosed: The main section of the capillary is glass-soldered to a small Kovar tube which in turn is welded to a thin-walled copper tube. The free end of the copper part is flared out and surrounds a close-fitting soldered-in Brewster window formed of quartz. In this structure, the solder joint between the window and its fitting is critical: Even if highly ductile materials such as copper are used, it is still subjected to heavy thermal stresses and can tear unless the fitting surfaces are made exactly to dimension and the soldering operation is performed with care. There is the further danger that the window will move out of adjustment through deformation of the ductile copper tube.

Today, a decision is usually made in favor of a step connection with several intermediate pieces which are as dimensionally stable as the tube and the window and which carry out the transition of the coefficients of thermal expansion of both parts in permissible jumps. This method yields good results, but is cumbersome and expensive. Thus, a commercially available 25-mW HeNe laser, in which a hardglass capillary is combined with a quartz window, contains at least four different intermediate glasses (Model "107" of the firm Spectra-Physics).

It is accordingly an object of the invention to provide a gas laser tube which overcomes the hereinafore-mentioned disadvantages of the heretofore-known devices of this general type with a transition unit which is easy to produce, makes a perfect seal and reliably holds the optical termination in its position.

With the foregoing and other objects in view there is provided, in accordance with the invention, a gas laser tube with a vacuum envelope, comprising:

a tubular section formed of an electrically insulating material with a coefficient of thermal expansion $\chi_1$;

an end section formed of an electrically insulating material with a coefficient of thermal expansion $\chi_2$, such that $$\left| \frac{H_1 - H_2}{H_i} \right| \geqq 0.2,$$

wherein i=1, 2; and
a transition element connecting the tubular section to the end section;

the transition element including a first metallic section adjacent the tubular section and a second metallic section, the first and second metallic sections having different respective coefficients of thermal expansion $\chi_3$ and $\chi_4$;

the first metallic section being thermally matched to the tubular section such that $$\left| \frac{H_1 - H_3}{H_m} \right| < 0.2,$$

wherein m=1, 3;
the second metallic section being thermally matched to the end section such that $$\left| \frac{H_2 - H_4}{H_n} \right| < 0.2,$$

wherein n=2, 4;
the first and second metallic sections having end surfaces with mutually complementary steps formed therein being disposed inside each other; and the first and second metallic sections having inner wall surfaces being joined together.

The invention is based on the fact that metal rings can be joined together vacuum-tightly without problems, even if their coefficients of thermal expansion $\chi$ differ considerably from each other. Thus, $\chi$ jumps of more than $100 \times 10^{-7}$ K.$^{-1}$ (degrees Kelvin) can be permitted without reservation. This means that practically all materials which can be considered for the envelope or the optical termination elements can be bridged by the intermediate part provided according to the invention. The two rings are pushed inside each other up to a stop, in such a way that they are automatically centered if they are joined together and can be welded or soldered together without special support fixtures. The joint itself can be efficiently provided, such as by an electron beam technique, and otherwise presents no problems because the plug-in system permits the use of suitable mechanically and thermally lightly-stressed abutment surfaces. Due to the fact that the connecting seam is on the inside, the transition element does not have a gap open toward the interior of the envelope. This situation, which at first glance may seem secondary, contributes considerably to a long service life, since residues frequently collect in hair-line cavities and are hard to remove with customary cleaning methods, so that they gradually poison the gas filling during the operation of the tube.

It is known from U.S. Pat. No. 4,352,185 to use two metal parts with $\chi$ values which are different from each other but are matched to their respective glass partners or components, between a glass envelope and a mirror body formed of glass. However, in this known laser, one of the metal parts has the shape of a cap instead of a ring and the metal-to-metal joint is made differently.

In accordance with another feature of the invention, the first and second metallic sections are first and second metal rings.

In accordance with a further feature of the invention, the inner wall surfaces of the metallic sections are welded or soldered together.

In accordance with an added feature of the invention, the end section is a tubular fitting, and including a window attached to the tubular fitting.

In accordance with an additional feature of the invention, the window is inclined at the Brewster angle.

In accordance with again another feature of the invention, the metal rings have ends facing each other, and the steps include outer and inner ridges in the form of a respective sharp enlargement of the inner wall surface of one of the metal rings at the end thereof, and a respective sharp reduction of the outer periphery of the other of the metal rings.

In accordance with again a further feature of the invention, the inner ridge is longer than the outer ridge.

In accordance with again an added feature of the invention, the outer ridge is formed on the first metal ring and the inner ridge is formed on the second metal ring.

In accordance with again an additional feature of the invention, the inner ridge is formed on the metal ring with the larger $\chi$ value.

In accordance with yet another feature of the invention, $$\left| \frac{H_3 - H_4}{H_o} \right| \geqq 0.4$$

and preferably (6) 0.6, wherein o=3, 4.

In accordance with yet a further feature of the invention, in the transition element: the ratio of the inner diameter to the total length thereof is between 0.5:1 and 1.5:1; the ratio of the length of one of the metal rings to the length of the other is between 0.7:1 and 1.3:1; and the ratio of the wall thickness to the total length is between 0.06:1 and 0.15:1.

In accordance with yet an added feature of the invention, the tubular section and the end section are formed of different types of glass such that $$35 \times 10^{-7} \text{ K.}^{-1} \leqq \chi_1 \leqq 55 \times 10^{-7} \text{ K.}^{-1} \text{ (degrees Kelvin) and}$$

$$80 \times 10^{-7} \text{ K.}^{-1} \leqq \chi_2 \leqq 100 \times 10^{-7} \text{ K.}^{-1} \text{ (degrees Kelvin).}$$

In accordance with yet an additional feature of the invention, $\chi_1$ is substantially $50 \times 10^{-7}$ K.$^{-1}$ (degrees Kelvin),
$\chi_2$ is substantially $95 \times 10^{-7}$ K.$^{-1}$ (degrees Kelvin),
the first metal ring is formed of $Ni_{28}Co_{13}F_{54}$, and the second metal ring is formed of $Ni_{51}Cr_1Fe_{48}$.

In accordance with a concomitant feature of the invention, the transition element is an electrode, preferably an anode electrode.

Other features which are considered as characteristic for the invention are set forth in the appended claims.

Although the invention is illustrated and described herein as embodied in a gas laser tube, it is nevertheless not intended to be limited to the details shown, since various modifications and structural changes may be made therein without departing from the spirit of the invention and within the scope and range of equivalents of the claims.

Figure 2:
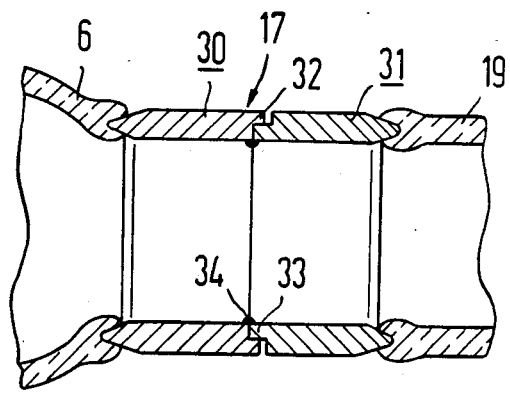

The construction and method of operation of the invention, however, together with additional objects and advantages thereof will be best understood from the following description of specific embodiments when read in connection with the accompanying drawings, in which:

FIG. 1 is a fragmentary, diagrammatic, lateral cross-sectional view of a laser tube; and FIG. 2 is an enlarged view of one of the two end sections of the tube within the circle II of FIG. 1.

Referring now to the figures of the drawing in detail and first particularly to FIG. 1 thereof, there is seen a tube, which may also be referred to as a tubular section or vacuum envelope section, which belongs to a 25-mW HeNe gas laser. The tube contains a cylindrical jacket 1 which is closed at end faces thereof by respective end plates 2, 3 forming a hollow body; this hollow body defines a space 4. A tube 5, which is a so-called fixing tube, protrudes far into the space 4 through the plate 2. An outwardly pointing tubular stub 6 with a calibrated inner periphery is formed on the end plate 3. A capillary 7 is pushed into the interior of the hollow body through the fixing tube 5 without making contact. The capillary 7 rests with one end thereof in the stub 6 providing a tight fit. As can be seen from FIG. 1, all of these parts are joined together to form a one-piece rotationally-symmetrical body.

The capillary 7 and the stub 6 are closed off from the outside by respective Brewster windows 8, 9. As can best be seen from FIG. 1, each of the windows is formed of a respective support plate 10, 11 which is coated on the inside thereof with a layer 12, 13. Respective transition elements 16, 17 and respective small tubes or end sections 18, 19 are disposed between the window 8 and the capillary 7 as well as between the window 9 and the stub 6. The tubes are cut at an angle $\alpha$ of 56° 40' and are hermetically sealed to the windows by glass solder 20, 21.

The capillary 7 has a bore hole 22 formed therein which communicates with the space 4 through an opening 23. A hollow core cathode 24 is disposed in the space 4. The hollow cold cathode 24 is electrically connected by a lead 25 to a feedthrough 26 inserted in the end plate 2. Disposed between the opening 23 and the cold cathode 24 is a protective bell 27 which protrudes from the jacket 1 and ensures that the emission is rotationally-symmetrical as far as possible and that the edge of the cathode is shielded, during operation of the tube.

The body having the parts 1 to 7 is formed of a hard glass which is offered by the firm Schott under the designation "8250" and has a coefficient of thermal expansion $\chi$ of $49 \times 10^{-7}$ K.$^{-1}$. This type of glass can be highly stressed mechanically and thermally. The support plates 10, 11 and the tubes or tubular fittings 18, 19 are formed of soft glass bearing the designation "GW" and sold by Schott, which has a $\chi$-value of $95 \times 10^{-7}$ K.$^{-1}$ and is particularly easy to solder. The glass solder is a soft solder which can be obtained from the firm Schott under the designation "G0.17/292", which matches the glass type "GW" and which satisfactorily wets the surfaces to be joined. The layers 12 and 13 are formed of sputtered-on quartz. The cathode is a zirconium cylinder. The hermetically sealed space contains a HeNe-mixture at 2.6 mbar, and the gas discharge is ignited with a voltage of about 12 kV and maintained with 4 kV.

The transition elements 16, 17 which simultaneously serve as an anode, each have the same shape and each are composed of two rings 28, 29 and 30, 31, respectively. The rings 28, 30 are formed of Ni$_{28}$Co$_{18}$Fe$_{54}$ and the rings 29, 31 are formed of Ni$_{51}$Cr$_1$Fe$_{48}$, i.e., of alloys which have the same thermal behavior as the glasses "8250" and "GW", respectively. All of the rings are glass-soldered to their glass partners or components (with slightly chamfered ends) and are connected to each other by a plug contact which is vacuum-tightly welded.

FIG. 2 shows this joint in detail: In the case of the rings 28, 30, the inner wall or periphery thereof is set back or offset in such a way that an outer ridge 32 is created, and the rings 29, 31 end in an inner ridge 33 due to an outer wall or periphery which is set back or offset in step-fashion. The outer ridge 32 is somewhat shorter than the inner ridge 33, so that when assembled, the rings come to a stop at the end face of the inner ridge 33. At a point 34, the two rings are welded together by an electron beam. The entire element has approximately the following dimensions: Total length: 10 mm; inside diameter: 6 mm; and outside diameter: 8 mm. The inner ridge 33 is about 0.5 mm long and 0.5 mm thick. At the location where the two rings are pushed over each other, they have dimensional tolerances of ±0.01 mm.

The invention is not limited to the embodiment shown. Thus, there is a certain amount of latitude in the choice of joining techniques: For instance, the metal parts could also be soldered on one or both sides, or joined together by means of argon-arc welding. Apart from this, other materials such as fused silica or (oxide) ceramic can also be considered for the envelope and the tubes in the end position; thermally matched materials are available for all these materials, (in this connection, reference may be made to the publication by H. Steyskal entitled "Working Processes and Materials in High-Vacuum Engineering", published by Physikverlag 1955, especially Chapter 3, or the publication by H. Katz entitled "Basic Technological Processes in Vacuum Electronics", published by Springer-Verlag 1974, especially Section 2). Otherwise, it is also entirely possible to close off the vacuum envelope with a mirror instead of a (Brewster) window and/or to directly use the transition element to set the terminating element.

The foregoing is a description corresponding in substance to German Application No. P 33 11 726.8, filed Mar. 30, 1983, the International priority of which is being claimed for the instant application, and which is hereby made part of this application. Any material discrepancies between the foregoing specification and the aforementioned corresponding German application are to be resolved in favor of the latter.

I claim:

1. A gas laser tube with a vacuum envelope, comprising:

a tubular section formed of an electrically insulating material with a coefficient of thermal expansion $\chi_1$; an end section formed of an electrically insulating material with a coefficient of thermal expansion $\chi_2$, such that $$\left| \frac{H_1 - H_2}{H_i} \right| \geq 0.2,$$

wherein $i = 1, 2$; and a transition element connecting said tubular section to said end section;

said transition element including a first metallic section in the form of a first metal ring adjacent said tubular section and a second metallic section in the form of a second metal ring, said first and second metallic sections having different respective coefficients of thermal expansion $\chi_3$ and $\chi_4$; said first metallic section being thermally matched to said tubular section such that $$\left| \frac{H_1 - H_3}{H_m} \right| < 0.2,$$

wherein $m = 1, 3$; said second metallic section being thermally matched to said end section such that $$\left| \frac{H_2 - H_4}{H_n} \right| < 0.2,$$

wherein $n = 2, 4$; said first and second metallic sections having end surfaces with mutually supplementary steps formed therein being disposed inside each other; said first and second metallic sections having inner wall surfaces being joined together;

said metal rings having ends facing each other, said mutually complimentary steps including outer and inner ridges in the form of a respective sharp increase of the inner wall surface area of one of said metal rings at said end thereof, and a respective sharp reduction of the diameter of the outer periphery of the other of said metal rings; and in said transition element; the ratio of the inner diameter to the total length thereof is between 0.5:1 and 1.5:1; the ratio of the length of one of said metal rings to the length of the other is between 0.7:1 and 1.3:1; and the ratio of the wall thickness to the total length is between 0.06:1 and 0.15:1.

2. A gas laser tube according to claim 1, wherein said inner wall surfaces of said metallic sections are welded together.

3. A gas laser tube according to claim 1, wherein said inner wall surfaces of said metallic sections are soldered together.

4. A gas laser tube according to claim 1, wherein said end section is a tubular fitting, and including a window attached to said tubular fitting.

5. A gas laser tube according to claim 4, wherein said window is inclined at the Brewster angle.

6. A gas laser tube according to claim 1, wherein said inner ridge is longer than said outer ridge.

7. A gas laser tube according to claim 1, wherein said outer ridge is formed on said first metal ring and said inner ridge is formed on said second metal ring.

8. A gas laser tube according to claim 1, wherein one of said different coefficients of thermal expansion of said metal rings is larger than the other and said inner ridge is formed on said metal ring with the larger coefficient of thermal expansion.

9. A gas laser tube according to claim 1, wherein $$\left| \frac{H_3 - H_4}{H_o} \right| \geq 0.4,$$

wherein o = 3, 4.

10. A gas laser tube according to claim 1, wherein $$\left| \frac{H_3 - H_4}{H_o} \right| \geq 0.6,$$

wherein o = 3, 4.

11. A gas laser tube according to claim 1, wherein said tubular section and said end section are formed of different types of glass such that
$35 \times 10^{-7} \text{ K.}^{-1} \leq \chi_1 \leq 55 \times 10^{-7} \text{ K.}^{-1}$ and $80 \times 10^{-7} \text{ K}^{-1} \leq \chi_2 \leq 100 \times 10^{-7} \text{ K.}^{-1}$.

12. A gas laser tube according to claim 1, wherein said transition element is an electrode.

13. A gas laser tube according to claim 1, wherein said transition element is an anode electrode.

14. A gas laser tube with a vacuum envelope, comprising:
a tubular section formed of an electrically insulating material with a coefficient of thermal expansion $\chi_1$;
an end section formed of an electrically insulating material with a coefficient of thermal expansion $\chi_2$, such that $$\left| \frac{H_1 - H_2}{H_i} \right| \geq 0.2,$$

wherein i = 1, 2; and
a transition element connecting said tubular section to said end section;
said transition element including a first metallic section adjacent said tubular section and a second metallic section;
said first and second metallic sections having different respective coefficients of thermal expansion $\chi_3$ and $\chi_4$;
said first metallic section being thermally matched to said tubular section such that $$\left| \frac{H_1 - H_3}{H_m} \right| < 0.2,$$

wherein m = 1, 3;
said second metallic section being thermally matched to said end section such that $$\left| \frac{H_2 - H_4}{H_n} \right| < 0.2,$$

wherein n = 2, 4;
said first and second metallic sections having end surfaces with mutually complementary steps formed therein being disposed inside each other; and said first and second metallic sections having inner wall surfaces being joined together,
$\chi_1$ being substantially $50 \times 10^{-7}$ K.$^{-1}$, and
$\chi_2$ being substantially $95 \times 10^{-7}$ K.$^{-1}$,
and said first metal ring is formed of $Ni_{28}Co_{18}F_{54}$, and said second metal ring is formed of $Ni_{51}Cr_1Fe_{48}$.

15. A gas laser tube with a vacuum envelope, comprising:
a tubular section formed of an electrically insulating material with a coefficient of thermal expansion $\chi_1$;
an end section formed of an electrically insulating material with a coefficient of thermal expansion $\chi_2$, such that $$\left| \frac{H_1 - H_2}{H_i} \right| \geq 0.2,$$

wherein i = 1, 2; and
a transition element connecting said tubular section to said end section;
said transition element including a first metallic section adjacent said tubular section and a second metallic section;
said first and second metallic sections having different respective coefficients of thermal expansion $\chi_3$ and $\chi_4$;
said first metallic section being thermally matched to said tubular section such that $$\left| \frac{H_1 - H_3}{H_m} \right| < 0.2,$$

wherein m = 1, 3;
said second metallic section being thermally matched to said end section such that $$\left| \frac{H_2 - H_4}{H_n} \right| < 0.2,$$

wherein n = 2, 4;
said first and second metallic sections having end surfaces with mutually complementary steps formed therein being disposed inside each other; and said first and second metallic sections having inner wall surfaces being joined together.

* * * * *